United States Patent [19]

Nishimura et al.

[11] Patent Number: 5,014,158

[45] Date of Patent: May 7, 1991

[54] LAMINATED CERAMIC CAPACITOR

[75] Inventors: Tsutomu Nishimura, Uji; Seiichi Nakatani, Hirakata; Satoru Yuhaku, Osaka; Yasuhiko Hakotani, Nishinomiya; Tatsuro Kikuchi, Hirakata, all of Japan

[73] Assignee: Matsushita Electric Industrial Co., Ltd., Osaka, Japan

[21] Appl. No.: 507,568

[22] Filed: Apr. 11, 1990

[30] Foreign Application Priority Data

Apr. 11, 1989 [JP] Japan .................................... 1-91302
Sep. 25, 1989 [JP] Japan .................................... 1-248327

[51] Int. Cl.$^5$ ......................... H01G 4/10; H01G 7/00
[52] U.S. Cl. .................................... 361/321; 29/25.42
[58] Field of Search .............. 29/25.42; 361/308, 309, 361/310, 320, 321, 328, 329, 330

[56] References Cited

U.S. PATENT DOCUMENTS

| 3,819,990 | 6/1974 | Hayashi et al. ...................... 29/25.42 |
| 4,115,493 | 9/1978 | Sakabe et al. ...................... 361/321 X |
| 4,241,378 | 12/1980 | Dorrian ............................ 361/321 X |
| 4,642,732 | 2/1987 | Ikeqa et al. ......................... 361/321 |
| 4,714,570 | 12/1987 | Nakatani et al. ...................... 252/518 |
| 4,863,683 | 9/1989 | Nakatani et al. ....................... 419/10 |

FOREIGN PATENT DOCUMENTS 55-53007 4/1980 Japan .
58-143515 8/1983 Japan .

Primary Examiner—Donald Griffin
Attorney, Agent, or Firm—Wenderoth, Lind & Ponack

[57] ABSTRACT

A laminated ceramic capacitor comprises a plurality of inner electrode layers for developing a capacitance, dielectric layers sandwiched with the inner electrode layers, and a pair of outer electrodes coupled to their associated inner electrode layers for output of the capacitance. The inner electrode layers are made of Ni. The dielectric layers are made of a dielectric ceramic composition having a structural formula of:

$$\{Ba_m(Ti_{1-x}Zr_x)O_2+m\}1-\alpha-\beta-\{MnO_2\}\alpha-\{X\}\beta$$

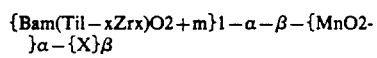

where X is at least one of Yb2O3, Dy2O3, and ThO2 and m, x, α, and β are expressed as:

$0.98 \leq m \leq 1.02$ $0 \leq x \leq 0.2$ $0.005 \leq \alpha \leq 0.05$ $0.001 \leq \beta \leq 0.02$ so that the laminated ceramic capacitor can be minimized in the size, increased in the capacitance, and reduced in the cost of production.

5 Claims, 2 Drawing Sheets

LAMINATED CERAMIC CAPACITOR

BACKGROUND OF THE INVENTION

1. Field of the Invention

The present invention relates to a laminated ceramic capacitor having inner electrodes made of base metal Ni, which serves as a surface-mount component in an electronic device.

2. Description of the Prior Art

It is known that a laminated ceramic capacitor comprises electrodes sandwiched with dielectric material and can integrally be formed by ceramic manufacturing techniques which contribute to the minimal size and the large capacitance. Such a laminated ceramic capacitor is low in impedance and suitable for high frequency applications and also, will last semipermanently ensuring the operational reliability.

Particularly, a chip type laminated ceramic capacitor comprises a plurality of inner electrode layers for developing a capacitance, dielectric layers sandwiched between the inner electrode layers, and a pair of outer electrodes coupled to their associated inner electrodes for output of the capacitance The chip capacitor has no lead line and can directly be mounted to an assembly, thus encouraging a corresponding electronic device to be minimized in size and increased in function density and ensuring further development for advanced applications.

The most of known laminated ceramic capacitors employ paradium (Pd) of noble metal as a material of inner electrode while accepting the same dielectric material as of other conventional not-laminated plate or disk ceramic capacitors furnished with lead lines and specifically, are fabricated by firing in the air. The difference of the laminated type from the plate or disk type is to involve a green sheet of dielectric other than a powder-pressed sheet. For example, a dielectric material for ambient air firing is disclosed in Japanese Patent Laid-open Publication 49-34905 (1974), which is produced by adding 0.2 to 1.0 % by molecular weight of $Gd_2O_3$, $Sm_{O3}$, or $Dy_2O_3$ to a powder of $BaTiO_3$ for the purpose of fabrication of a high-frequency high-voltage ceramic capacitor having less change in the temperature of capacitance within a range from 0° to 65° C. Also, disclosed in the Publication 55-53007 (1980) is a dielectric material for ambient air firing which is adapted for attenuating the temperature hysteresis in a dielectric constant and formed by adding more than 0.1 % by atomic weight of at least one of $La_2O_3$, $Sm_2O_3$, $Gd_2O_3$, and $Dy_2O_3$ to a solid solution of barium titanate in which portions of ion component are replaced with Sr, Zr, or Sn, without changing the crystal structure of the solid solution. Those dielectric materials are also processed by firing in the air before being used. The requirements for improving conventional laminated ceramic capacitors will now be explained in detail. Simply, three key requirements are to minimize the size, to increase the capacitance, and to contribute to the low cost. The capacitance of a laminated ceramic capacitor is expressed by:

$$C = \epsilon_0 \epsilon_s \frac{S}{d} n \quad (1)$$

$\epsilon_0$: dielectric constant in vacuum
$\epsilon_s$: relative dielectric constant of dielectric material
S: effective electrode area per layer
d: thickness of dielectric layer
n: number of layers As apparent from the formula (1), for increasing the capacitance, it is most practical to enhance the dielectric capacity, increase the number of layers for ensuring a large surface area of the electrode, and reduce the thickness of each dielectric layer. All the efforts for achievement have been made by numbers of firms.

For minimizing the size, a chip is reduced from 3.2 mm×1.6 mm to 2.0 mm×1.25 mm and further from 1.6 mm×0.8 mm to 1.0 mm to 0.5 mm.

Reduction in the cost will then be described. The prior art laminated ceramic capacitor has inner electrodes which are made from a noble metal Pd and thus, will cost high as compared with other components: it is said, more than 70% the total production cost. The greater the capacitance, the higher the cost soars. Although excellent in the dielectric characteristics and the operational reliability, the laminated ceramic capacitor is yet disadvantageous in the cost of production, thus offering less marketability.

It is hence understood that the low cost or the reduction in the cost of fabricating inner electrodes is the most important factor among the foregoing three requirements. Both the reduction in size and the increase in capacitance depend on their means of production procedures rather than the properties of materials and have to be tackled for achievement simultaneously while corresponding measures are taken to reduce the cost.

There is a continuation of the trend towards employing base metals for inner electrodes in order to reduce the cost. More particularly, the inner electrode is made of nickel (Ni). However, its disadvantage to be overcome is notable as a base metal Primarily, Ni is easily oxidized during firing in the air, failing to work as inner electrodes. Thus, it should be burned in the neutral or reducing atmosphere, preventing oxidation on the electrodes In such atmosphere, the foregoing dielectric material is reduced lowering the insulation resistance, because barium titanate ($BaTiO_3$), a primary component of the dielectric material becomes semiconductive. It is believed that oxygen defect in the atmosphere partially shifts $Ti^{4+}$ to $Ti^{3+}$ causing electronic conduction in hopping (refer to "Innst Electr Engs. Paper 3634" by Glaister R. M., in 1961).

For use with the inner electrodes of Ni, it is thus essential to employ a dielectric material which is not reduced under low-oxygen atmosphere.

Such a novel dielectric material as remaining unreduced in the neutral or reducing atmosphere is described in U.S. Pat. No. 3,920,781, and "High permittivity ceramics sintered in hydrogen" to J. M. Herbert, issued in 1963, in which transition metal oxide or $MnO_2$ is preferably provided for addition. The disadvantages are that the dielectric constant is low and that variations in the Curie point are notably great depending on the temperature, time, and atmosphere during firing. Also, another dielectric material is disclosed in U.S. Pat. No. 4,115,493, which is a barium titanate composition having a structural formula of:

$$\{(Ba_{1-x}Ca_x)O\}_m \cdot (Ti_{1-y}Zr_y)O_2$$

where m, x, and y are expressed as:

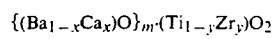

$$0.02 \leq x \leq 0.22$$

$$0 < y \leq 0.20$$

A further dielectric material is disclosed in Japanese Patent Laid-open Publication 58-143515 (1983), in which a laminated ceramic capacitor employing base metal electrodes is provided with dielectric having a formula of:

$$(Ba_{1-x}Y_x)A(Ti_{1-y}Zr_y)B + z \text{ wt \% M}$$

where M is an oxide of Mg, Cr, V, Mn, Sn, In, or W and x, y, A/B, and z are expressed as:

$$0.005 \leq x \leq 1.03$$

$$0 \leq y \leq 0.3$$

$$1.00 < A/B \leq 1.05$$

$$0 < z \leq 1.0$$

The resultant dielectric constant is however not high enough, contributing to the large capacitance unsuccessfully.

Secondly, a method of production procedures is also an important factor for fabricating a laminated ceramic capacitor having inner electrodes of Ni base metal; particularly, a process of firing. Some organic materials are commonly used in production of laminated ceramic capacitor in the form of organic binder, plasticizer, and solvent all added during making a green sheet and also, organic binder solvent contained in a paste for inner electrode. While the solvent is dispersed off by drying, both the organic binder and plasticizer remain unaffected prior to firing. During a common firing process in the air, such organic components are eliminated by burning out at a firing step. However, in the neutral or reducing atmosphere and more specifically, the atmosphere in which Ni of the electrode remains unoxidized, the elimination of organic components is found difficult. A solution to this problem is disclosed in U.S. Pat. No. 4,714,570, in which a method of metallizing base metal electrodes is introduced employing base metal oxide such as NiO, Fe₂O₃, or CoO as a starting material of the electrodes. It features the successive steps of removal of binder in the air, reduction in hydrogen gas, and firing in nitrogen gas. Non of metallic elements such as Ni, Co, or Fe is used because of preventing a change in volume which results from oxidation during binder removal and will cause cracking in the dielectric layer. This method covers both the procedures of metallizing base metal and eliminating organic components.

SUMMARY OF THE INVENTION

It is a primary object of the present invention to provide a laminated ceramic capacitor having dielectric layers made of a dielectric ceramic composition which remains unreduced during firing in the neutral or reducing atmosphere and inner electrodes made of nickel (Ni), a base metal, for reducing the size, increasing the capacitance, and contributing to the low cost of production.

To achieve the above object, the laminated ceramic capacitor according to the present invention comprises a plurality of inner electrode layers for developing a capacitance, and dielectric layers sandwiched with the inner electrode layers, and a pair of outer electrodes coupled to their associated inner electrode layers for output of the capacitance. The inner electrode layers are made of Ni, and the dielectric layers are made of a dielectric ceramic composition having a structural formula of:

$$\{Ba_m(Ti_{1-x}Zr_x)O_{2+m}\}_{1-\alpha-\beta} - \{MnO_2\}_\alpha - \{X\}_\beta$$

where X is at least one of $Yb_2O_3$, $Dy_2O_3$, and $ThO_2$ and m, x, $\alpha$, and $\beta$ are expressed as:

$$0.98 \leq m \leq 1.02$$

$$0 \leq x \leq 0.2$$

$$0.005 \leq \alpha \leq 0.05$$

$$0.001 \leq \beta \leq 0.02$$

$MnO_2$ is effective to suppress the semiconductizing of barium titanate $BaTiO_3$ during firing in the low-oxygen atmosphere. Accordingly, after the firing in the low-oxygen atmosphere, the dielectric layer remains favorable in insulation resistance.

Also, the dielectric composition containing the X component as well as $MnO_2$ can suppress a change in the Tc point (Curie temperature) resulting from variations in the temperature, time, and atmospheric conditions during firing with only the addition of $MnO_2$. In addition, the higher dielectric constant will be stimulated.

Addition of NiO component allows the dissipation factor (tan δ) to be declined without affecting the advantages of $MnO_2$ and the X component. Also, NiO can reduce the sintering temperature of the dielectric and help developing a finer sintered product, thus contributing to the low cost of production and the improvement in operational reliability.

By addition with $Y_2O_3$, the grain growth of the dielectric are uniformly built up after the firing and the insulation resistance will be enhanced as compared with the addition with only X component or $MnO_2$. If the X component only is added, the dielectric constant increases but also the development of grain growth of the dielectric are excessively accelerated (>10 μm), possibly causing instability in time and degradation in the operational reliability.

The addition of $Y_2O_3$ only increases the dielectric constant less than the addition of $MnO_2$. Hence, by adding $Y_2O_3$ and the X component simultaneously to the dielectric, the respective components can be more characterized ensuring the high dielectric constant and the improved reliability.

Also, to accomplish the foregoing object, a laminated ceramic capacitor according to the present invention comprises a plurality of inner electrode layers for developing a capacitance, and dielectric layers sandwiched with the inner electrode layers, and a pair of outer electrodes coupled to their associated inner electrode layers for output of the capacitance. The inner electrode layers are made of Ni and the dielectric layers are made of a dielectric ceramic composition having a structural formula of:

$$\{(Ba_{1-x}Ca_x)_m(Ti_{1-y}Zr_y)O_{2+m}\}_{1-\alpha-\beta} - \{MnO_2\}_\alpha - \{X\}_\beta$$

where X is at least more than one of $Yb_2O_3$ and $Dy_2O_3$ and m, x, y, $\alpha$, and $\beta$ are expressed as:

$$0.98 \leq m \leq 1.02$$

$$0 < x \leq 0.02$$

$$0 < y \leq 0.2$$

$$0.005 \leq \alpha \leq 0.05$$

$$0.001 \leq \beta \leq 0.02$$

With this composition, the grain growth are uniformly developed to 3 to 4 $\mu$m as well as the advantage of addition of $Y_2O_3$. The dielectric material remains unchanged in characteristics when shaped in a multi-thin-layer form, thus ensuring the large capacitance. Furthermore, as Ca is contained, variations in the characteristics induced during plating of the outer electrodes can be attenuated.

DESCRIPTION OF THE PREFERRED EMBODIMENTS

Preferred embodiments of the present invention will be described referring to the accompanying drawings.

Figure 1:
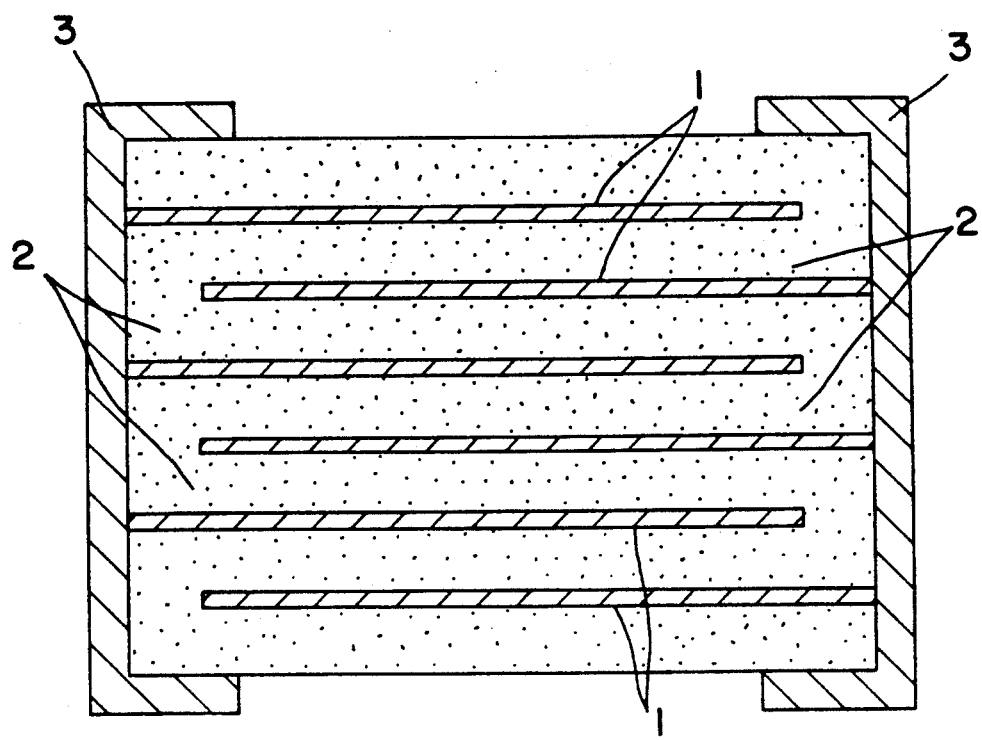
FIG. 1 is a schematic cross sectional view of a laminated ceramic capacitor according to the present invention.

FIG. 1 is a schematic cross sectional view of a laminated ceramic capacitor according to the present invention which comprises a plurality of inner electrode layers for developing a capacitance, dielectric layers sandwiched with the inner electrode layers, and a pair of outer electrodes coupled to the associated inner electrode layers for output of the capacitance. As shown in FIG. 1, the inner electrode layer is represented by 1, the dielectric layer 2, and the outer electrode 3. The inner electrode layer 1 according to the present invention consists of a base metal Ni. The composition of the dielectric layer 2 has a structural formula represented by:

$$\{Ba_m(Ti_{1-x}Zr_x)O_{2+m}\}_{1-\alpha-\beta}-\{MnO_2\}_\alpha-\{X\}_\beta$$

where X is a dielectric ceramic composition consisting of at least more than one of $Yb_2O_3$, $Dy_2O_3$, and $ThO_2$ and m, x, $\alpha$, and $\beta$ are expressed as:

$$0.98 \leq m \leq 1.02$$

$$0 x \leq 0.2$$

$$0.005 \leq \alpha \leq 0.05$$

$$0.001 \leq \beta \leq 0.02$$

The dielectric layer 2 is also provided having a composition represented by:

$$\{(Ba_{1-x}Ca_x)_m(Ti_{1-y}Zr_y)O_{2+m}\}_{1-\alpha-\beta}-\{MnO_2\}_\alpha-\{X\}_\beta$$

where X is a dielectric ceramic composition consisting of at least more than one of $Yb_2O_3$ and $Dy_2O_3$ and m, x, y, $\alpha$, and $\beta$ are expressed as:

$$0.98 \leq m \leq 1.02$$

$$0 < x \leq 0.02$$

$$0 \leq y \leq 0.2$$

$$0.005 \leq \alpha \leq 0.05$$

$$0.001 \leq \beta \leq 0.02$$

The procedure of making producing a laminated ceramic capacitor starts with producing an unsintered layer of inner electrode from a starting material of NiO. The unsintered layer is then heat treated in the air for removal of organic components. NiO of the inner electrode layer is reduced to Ni in the atmosphere of hydrogen gas. Then, the inner electrode layers and the dielectric layers are both sintered within the atmosphere of $N_2 + H_2$ gas. The external electrodes are now applied to the ends of the sintered body and then burned in a nitrogen gas.

A number of the laminated ceramic capacitors were produced in that manner for experimental use. A procedure of metallizing of high base metal electrodes is fully described in U.S. Pat. No. 4,714,570 employing base metal oxide as a starting material.

EXAMPLE 1

First, both barium titanate ($BaTiO_3$) and barium zirconate ($BaZrO_3$) were composed by solid phase reaction for using as starting materials of dielectric body.

$BaTiO_3$ was obtained by mixing up two reagents of $BaCO_3$ and $TiO_2$ in a ball mill for 24 hours, using a solvent of distilled water. After dried, $BaTiO_3$ was calcined at 1200° C. for two hours and wet ground in the ball mill for 48 hours prior to drying out. Also, $BaZrO_3$ was produced from $BaCO_3$ and $ZrO_2$ in the same manner as of $BaTiO_3$. The average diameter of each particle of $BaTiO_3$ and $BaZrO_3$ was about 1.0 $\mu$m measured by means of SEM (scanning electron microscope) photography. In addition, a reagent of $MNO_2$ was wet ground by a ball mill to about 1.5 $\mu$m of particle diameter. Reagents of $Yb_2O_3$, $Dy_2O_3$, and $ThO_2$ were processed nor grounded.

At least more than one of $BaTiO_3$, $BaZrO_3$, $MnO_2$, $Yb_2O_3$, $Dy_2O_3$, and $ThO_2$ were balanced constituting inorganic components. Then, organic components of organic binder, plasticizer, and solvent were added to the inorganic components. Both the components were mixed together with the use of YTZ balls of 5 mm diameter within a polymer container for 72 hours, before turning to a slurry form.

Table 1 shows the ratio of the inorganic and organic components.

TABLE 1

| MATERIAL | | | LOADED AMOUNT |
|---|---|---|---|
| INORGANIC COMPONENT | DIELECTRIC MATERIAL | | 30 g |
| ORGANIC COMPONENT | ORGANIC BINDER | PVB RESIN | 2.4 g |
| | PLASTICIZER | BENZYL BUTYL PHTHALATE | 1.5 g |
| | SOLVENT | TOLUENE | 12 g |
| | | ETHANOL | 8 g |

The ratio of composition of the inorganic components is shown in Table 4 along with the characteristics. The slurry was degassed by vacuum defoaming and applied to an organic film (of PET, polyethylene terephthrate, 75 μm in thickness) for developing a layer of green sheet by a procedure of doctor blade. Using the blade, the green sheet was produced having a thickness of about 40 μm when dried out. Table 2 shows the conditions for making such green sheets.

TABLE 2

| CONDITION | | THICKNESS OF GREEN SHEET |
|---|---|---|
| GAP | 200 μm | ABOUT 40 μm AFTER DRYING |
| FILMING SPEED | 180 mm/min | |

The green sheet produced was then trimmed to 80 mm×65 mm. By screen printing, predetermined patterns of paste material mainly composed of nickel oxide (NiO) which is in the form of particles of 1.5 μm diameter in average, were screen printed on the green sheet. The paste material had been provided by mixing up such different materials as shown in Table 3 with a three-roll mill.

TABLE 3

| MATERIAL | | | LOADED AMOUNT | |
|---|---|---|---|---|
| INORGANIC COMPONENT | NiO PURE (1.5 μm) | | 10 g | |
| VEHICLE | ORGANIC BINDER | ETHYL CELLULOSE | 5.5 cc | 8 wt % |
| | SOLVENT | TERPINEOL | | 92 wt % |

20 of the green sheets carrying the patterns of inner electrodes were integrally laminated by heat bonding under a pressure of 150 kg/cm² at 40° C. for one minute, so that the inner electrode patterns came confronting one another. After pressing, the lamination was cut down to a size of 4 mm×3 mm constituting a green chip.

The green chip was then thermally treated at 700° C. in the air for two hours for removal of the binders. This procedure is specifically illustrated in FIG. 2 referring to the relation of an atmospheric profile to a temperature. The purpose of this procedure is to remove organic binder components from both the green sheets and the NiO paste.

Figure 3:
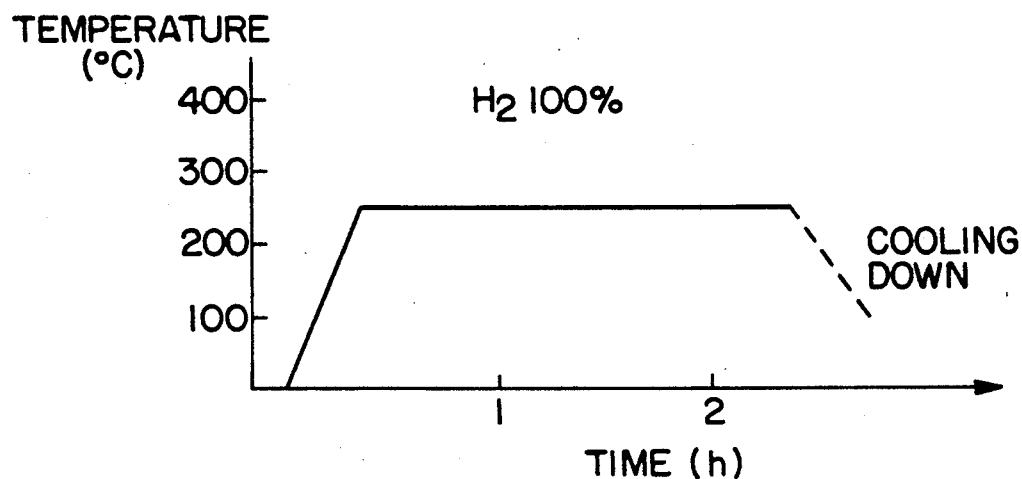
FIG. 3 is a diagram showing a relation of the atmospheric profile to the temperature at the step of reduction during the procedure of making the laminated ceramic capacitor of the present invention.

After the removal of binders, carbon residue in the primary body was measured and found non exhibiting no presence of the organic binders Then, the inner electrodes in the primary body were reduced at 250° C. for two hours in the atmosphere of 100% hydrogen gas, converting nickel oxide thereof into nickel metal, while the dielectric layers remained unreduced. FIG. 3 shows a relation of the atmospheric profile to the temperature in the procedure of reduction.

Figure 4:
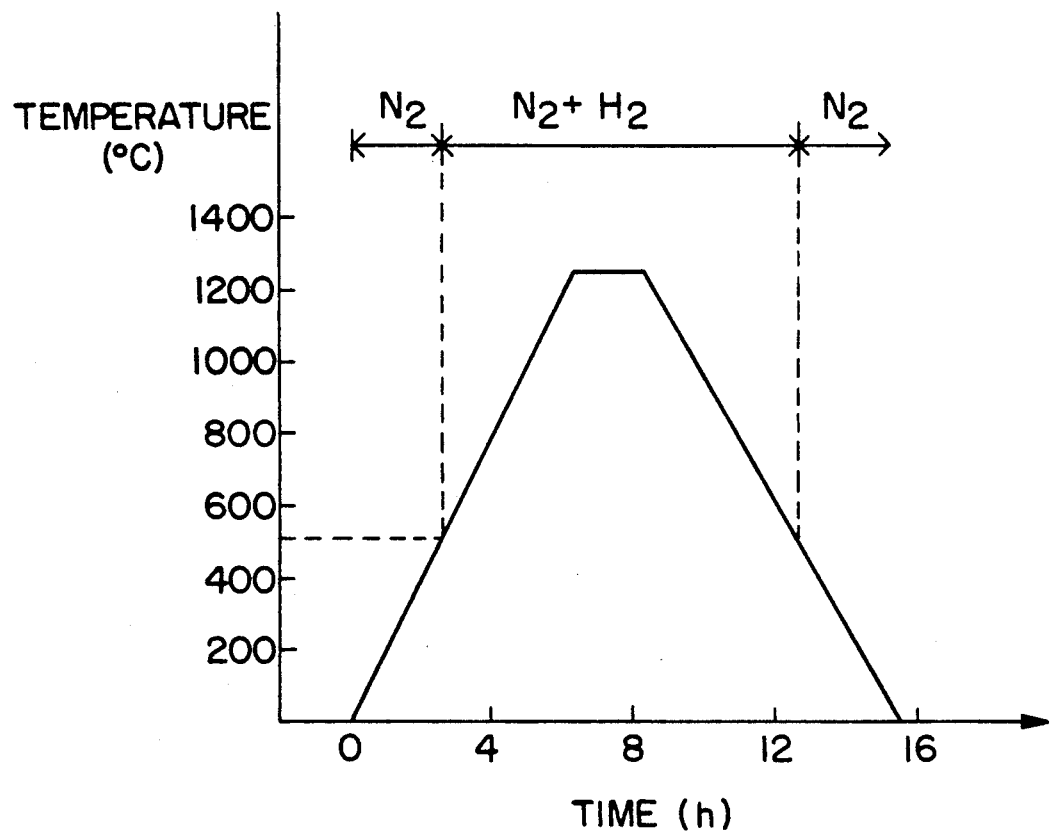
FIG. 4 is a diagram showing a relation of the atmospheric profile to the temperature at the step of firing during the procedure of making the laminated ceramic capacitor of the present invention.

The primary body after reduced was then burned, of which firing procedure is shown FIG. 4 referring to the atmospheric profile relative to the temperature. The firing was carried out at 1250° C. for two hours, using $N_2$ gas as a carrier gas. The atmosphere was maintained by controlling a flow of green gas ($H_2/N_2 = 10/90$) so that oxygen in the electric furnace used was $10^{-9}$ atm in temperature region at more than 500° C.

A commercially available paste of Cu for firing at 900° C. in the nitrogen atmosphere was applied to both the side ends of the resultant sintered body as designated the outer electrodes and baked in a mesh conveyor belt furnace for providing a specimen for characteristic test.

The capacitance and the dissipation factor were measured at an input signal level of 1.0 $V_{rms}$ with 1 kHz of frequency. Also, the specific dielectric constant was calculated from the capacitance. Then, a DC voltage of 50 V was applied for one minute and simultaneously, the insulation resistance was measured.

The measurement of such characteristics was executed with the specimen which remained immersed in a common temperature tub kept at 25° C. when had been left for at least three hours after sintering of the outer electrodes.

Prior to calculation of the relative dielectric constant, the specimen was polished having each dielectric layer of about 25 μm in thickness and the inner electrodes of 1.67 mm×1.67 mm (2 mm×2 mm after printing) in effective area which all were measured by an optical microscope. The thickness of each inner electrode was about 3 to 4 μm.

The characteristics and the composite ratio of components of the dielectric material in each specimen are listed in Table 4.

TABLE 4

| SPECIMEN NO. | BaTiO₃ (mol %) | BaZrO₃ (mol %) | MnO₂ (mol %) | ADDITIVE (mol %) | | | CHARACTERISTICS | | |
|---|---|---|---|---|---|---|---|---|---|
| | | | | Yb₂O₃ | Dy₂O₃ | ThO₂ | DIELECTRIC CONSTANT | tan δ (%) | INSULATION RESISTANCE (Ω) |
| 1 | 97.5 | | 0.5 | 2.0 | — | — | 7286 | 1.92 | 4.3 × 10¹⁰ |
| 2 | " | | " | — | 2.0 | — | 7815 | 1.86 | 2.7 × 10¹⁰ |
| 3 | " | | " | — | — | 2.0 | 7345 | 1.77 | 1.5 × 10¹⁰ |
| 4 | " | | " | 1.0 | 1.0 | — | 7606 | 1.84 | 3.6 × 10¹⁰ |
| 5 | " | | " | 1.0 | — | 1.0 | 7587 | 1.75 | 2.1 × 10¹⁰ |
| 6 | " | | " | — | 1.0 | 1.0 | 7207 | 2.06 | 1.0 × 10¹⁰ |
| 7 | " | | " | 0.7 | 0.7 | 0.6 | 7229 | 1.97 | 2.1 × 10¹⁰ |
| 8 | 96.5 | | 2.0 | 1.5 | — | — | 8629 | 1.66 | 5.8 × 10¹⁰ |
| 9 | " | | " | — | 1.5 | — | 9137 | 1.69 | 4.7 × 10¹⁰ |
| 10 | " | | " | — | — | 1.5 | 8132 | 1.72 | 3.7 × 10¹⁰ |
| 11 | " | | " | 0.75 | 0.75 | — | 9009 | 1.74 | 4.8 × 10¹⁰ |

TABLE 4-continued

| SPECIMEN NO. | BaTiO$_3$ (mol %) | BaZrO$_3$ (mol %) | MnO$_2$ (mol %) | ADDITIVE (mol %) | | | CHARACTERISTICS | | |
|---|---|---|---|---|---|---|---|---|---|
| | | | | Yb$_2$O$_3$ | Dy$_2$O$_3$ | ThO$_2$ | DIELECTRIC CONSTANT | tan δ (%) | INSULATION RESISTANCE (Ω) |
| 12 | " | | " | 0.75 | — | 0.75 | 8243 | 1.81 | 2.9 × 10$^{10}$ |
| 13 | " | | " | — | 0.75 | 0.75 | 8892 | 1.67 | 2.5 × 10$^{10}$ |
| 14 | " | | " | 0.5 | 0.5 | 0.5 | 8604 | 1.65 | 2.5 × 10$^{10}$ |
| 15 | 94.0 | | 5.0 | 1.0 | — | — | 8641 | 1.71 | 7.2 × 10$^{10}$ |
| 16 | " | | " | — | 1.0 | — | 9731 | 1.81 | 6.6 × 10$^{10}$ |
| 17 | " | | " | — | — | 1.0 | 8961 | 1.67 | 3.9 × 10$^{10}$ |
| 18 | " | | " | 0.5 | 0.5 | — | 9395 | 1.99 | 6.7 × 10$^{10}$ |
| 19 | " | | " | 0.5 | — | 0.5 | 8966 | 1.92 | 4.2 × 10$^{10}$ |
| 20 | " | | " | — | 0.5 | 0.5 | 9261 | 1.85 | 2.8 × 10$^{10}$ |
| 21 | " | | " | 0.3 | 0.3 | 0.4 | 9015 | 1.77 | 3.4 × 10$^{10}$ |
| 22 | 93.3 | 5.0 | 0.5 | 1.2 | — | — | 10243 | 1.81 | 5.2 × 10$^{10}$ |
| 23 | " | " | " | — | 1.2 | — | 10892 | 1.84 | 4.1 × 10$^{10}$ |
| 24 | " | " | " | 0.6 | — | 1.2 | 10060 | 1.84 | 3.0 × 10$^{10}$ |
| 25 | " | " | " | 0.6 | 0.6 | — | 10511 | 1.85 | 4.3 × 10$^{10}$ |
| 26 | 93.3 | 0.5 | 0.5 | 0.6 | — | 0.6 | 10083 | 1.73 | 5.5 × 10$^{10}$ |
| 27 | " | " | " | — | 0.6 | 0.6 | 10707 | 1.67 | 6.9 × 10$^{10}$ |
| 28 | " | " | " | 0.4 | 0.4 | 0.4 | 10069 | 1.92 | 3.0 × 10$^{10}$ |
| 29 | 92.0 | " | 2.0 | 1.0 | — | — | 10961 | 1.86 | 4.3 × 10$^{10}$ |
| 30 | " | " | " | — | 1.0 | — | 11575 | 1.74 | 3.0 × 10$^{10}$ |
| 31 | " | " | " | — | — | 1.0 | 11117 | 1.27 | 5.1 × 10$^{10}$ |
| 32 | " | " | " | 0.5 | 0.5 | — | 11225 | 1.51 | 4.0 × 10$^{10}$ |
| 33 | " | " | " | 0.5 | — | 0.5 | 10059 | 1.54 | 3.7 × 10$^{10}$ |
| 34 | " | " | " | — | 0.5 | 0.5 | 10359 | 1.61 | 5.0 × 10$^{10}$ |
| 35 | " | " | " | 0.3 | 0.3 | 0.4 | 10350 | 1.68 | 3.4 × 10$^{10}$ |
| 36 | 89.4 | " | 5.0 | 0.6 | — | — | 10464 | 1.73 | 6.9 × 10$^{10}$ |
| 37 | " | " | " | — | 0.6 | — | 10447 | 1.88 | 5.2 × 10$^{10}$ |
| 38 | " | " | " | — | — | 0.6 | 10324 | 1.55 | 5.0 × 10$^{10}$ |
| 39 | " | " | " | 0.3 | 0.3 | — | 10284 | 1.12 | 4.7 × 10$^{10}$ |
| 40 | " | " | " | 0.3 | — | 0.3 | 9981 | 1.73 | 4.7 × 10$^{10}$ |
| 41 | " | " | " | — | 0.3 | 0.3 | 10095 | 1.65 | 3.9 × 10$^{10}$ |
| 42 | " | " | " | 0.2 | 0.2 | 0.2 | 10001 | 1.48 | 4.3 × 10$^{10}$ |
| 43 | 88.7 | 10.0 | 0.5 | 0.8 | — | — | 12165 | 1.51 | 1.1 × 10$^{11}$ |
| 44 | " | " | " | — | 0.8 | — | 12455 | 1.52 | 9.7 × 10$^{10}$ |
| 45 | " | " | " | — | — | 0.8 | 12072 | 1.61 | 7.9 × 10$^{10}$ |
| 46 | " | " | " | 0.4 | 0.4 | — | 12328 | 1.77 | 1.0 × 10$^{11}$ |
| 47 | " | " | " | 0.4 | — | 0.4 | 11078 | 1.68 | 9.5 × 10$^{10}$ |
| 48 | " | " | " | — | 0.4 | 0.4 | 11523 | 1.59 | 6.5 × 10$^{10}$ |
| 49 | " | " | " | 0.25 | 0.25 | 0.3 | 10393 | 1.27 | 8.8 × 10$^{10}$ |
| 50 | 87.5 | " | 2.0 | 0.5 | — | — | 10656 | 1.35 | 2.1 × 10$^{11}$ |
| 51 | 87.5 | 10.0 | 2.0 | — | 0.5 | — | 12988 | 1.28 | 9.3 × 10$^{10}$ |
| 52 | " | " | " | — | — | 0.5 | 11150 | 1.41 | 7.9 × 10$^{10}$ |
| 53 | " | " | " | 0.25 | 0.25 | — | 12074 | 1.21 | 1.4 × 10$^{11}$ |
| 54 | " | " | " | 0.25 | — | 0.25 | 10908 | 1.33 | 1.3 × 10$^{11}$ |
| 55 | " | " | " | — | 0.25 | 0.25 | 12007 | 1.37 | 9.2 × 10$^{10}$ |
| 56 | " | " | " | 0.15 | 0.15 | 0.20 | 11476 | 1.45 | 1.0 × 10$^{11}$ |
| 57 | 84.8 | " | 5.0 | 0.2 | — | — | 10238 | 1.38 | 8.8 × 10$^{10}$ |
| 58 | " | " | " | — | 0.2 | — | 12317 | 1.61 | 8.3 × 10$^{10}$ |
| 59 | " | " | " | — | — | 0.2 | 11191 | 1.26 | 7.5 × 10$^{10}$ |
| 60 | " | " | " | 0.1 | 0.1 | — | 10677 | 1.33 | 8.1 × 10$^{10}$ |
| 61 | " | " | " | 0.1 | — | 0.1 | 10424 | 1.42 | 7.6 × 10$^{10}$ |
| 62 | " | " | " | — | 0.1 | 0.1 | 11365 | 1.44 | 7.1 × 10$^{10}$ |
| 63 | 84.0 | 15.0 | 0.5 | 0.05 | — | — | 10471 | 1.47 | 4.9 × 10$^{10}$ |
| 64 | " | " | " | — | 0.5 | — | 11884 | 1.44 | 3.5 × 10$^{10}$ |
| 65 | " | " | " | — | — | 0.5 | 10900 | 1.51 | 3.2 × 10$^{10}$ |
| 66 | " | " | " | 0.25 | 0.25 | — | 11385 | 1.69 | 4.6 × 10$^{10}$ |
| 67 | " | " | " | 0.25 | — | 0.25 | 10224 | 1.58 | 3.1 × 10$^{10}$ |
| 68 | " | " | " | — | 0.25 | 0.25 | 11626 | 1.72 | 2.9 × 10$^{10}$ |
| 69 | " | " | " | 0.15 | 0.15 | 0.20 | 10879 | 1.55 | 3.4 × 10$^{10}$ |
| 70 | 82.8 | " | 2.0 | 0.2 | — | — | 10005 | 1.30 | 6.8 × 10$^{10}$ |
| 71 | " | " | " | — | 0.2 | — | 10924 | 1.58 | 5.9 × 10$^{10}$ |
| 72 | " | " | " | — | — | 0.2 | 10333 | 1.47 | 5.2 × 10$^{10}$ |
| 73 | " | " | " | 0.1 | 0.1 | — | 10047 | 1.59 | 6.4 × 10$^{10}$ |
| 74 | " | " | " | 0.1 | — | 0.1 | 9879 | 1.71 | 6.2 × 10$^{10}$ |
| 75 | " | " | " | — | 0.1 | 0.1 | 10116 | 1.70 | 4.8 × 10$^{10}$ |
| 76 | 81.9 | 15.0 | 3.0 | 0.1 | — | — | 8745 | 1.59 | 7.2 × 10$^{10}$ |
| 77 | " | " | " | — | 0.1 | — | 9227 | 1.71 | 5.9 × 10$^{10}$ |
| 78 | " | " | " | — | — | 0.1 | 8559 | 1.80 | 4.7 × 10$^{10}$ |
| 79 | 79.2 | 20.0 | 0.5 | 0.3 | — | — | 7211 | 1.75 | 8.8 × 10$^{10}$ |
| 80 | " | " | " | — | 0.3 | — | 8894 | 1.58 | 7.7 × 10$^{10}$ |
| 81 | " | " | " | — | — | 0.3 | 7555 | 1.76 | 4.8 × 10$^{10}$ |
| 82 | " | " | " | 0.15 | 0.15 | — | 8069 | 1.65 | 5.5 × 10$^{10}$ |
| 83 | " | " | " | 0.15 | — | 0.15 | 7224 | 1.48 | 4.4 × 10$^{10}$ |
| 84 | " | " | " | — | 0.15 | 0.15 | 7963 | 1.52 | 3.7 × 10$^{10}$ |
| 85 | " | " | " | 0.1 | 0.1 | 0.1 | 7448 | 1.53 | 4.1 × 10$^{10}$ |
| 86 | 78.8 | " | 1.0 | 0.2 | — | — | 7428 | 1.66 | 6.9 × 10$^{10}$ |
| 87 | " | " | " | — | 0.2 | — | 9720 | 1.49 | 6.5 × 10$^{10}$ |
| 88 | " | " | " | — | — | 0.2 | 8115 | 1.59 | 5.7 × 10$^{10}$ |

TABLE 4-continued

| SPECIMEN NO. | BaTiO$_3$ (mol %) | BaZrO$_3$ (mol %) | MnO$_2$ (mol %) | ADDITIVE (mol %) Yb$_2$O$_3$ | Dy$_2$O$_3$ | ThO$_2$ | CHARACTERISTICS DIELECTRIC CONSTANT | tan δ (%) | INSULATION RESISTANCE (Ω) |
|---|---|---|---|---|---|---|---|---|---|
| 89 | " | " | " | 0.1 | 0.1 | — | 9074 | 1.63 | 6.9 × 10$^{10}$ |
| 90 | " | " | " | 0.1 | — | — | 8997 | 1.64 | 5.1 × 10$^{10}$ |
| 91 | " | " | " | — | 0.1 | 0.1 | 8654 | 1.71 | 4.8 × 10$^{10}$ |
| 92 | 77.9 | " | 2.0 | 0.1 | — | 0.1 | 7432 | 1.88 | 7.2 × 10$^{10}$ |
| 93 | " | " | " | — | 0.1 | — | 8025 | 1.62 | 6.5 × 10$^{10}$ |
| 94 | " | " | " | — | — | 0.1 | 7769 | 1.59 | 7.7 × 10$^{10}$ |

As apparent from Table 4, the laminated ceramic capacitor of the present invention is higher in the dielectric constant and offers practically satisfactory values of dielectric dissipation factor and insulation resistance. It is understood that the relative dielectric constant is rather low depending on the composition of the dielectric material and the Tc point (Curie temperature) is not always maintained at an optimum level as being inadvertently dislocated by a shifter which incorporates the function of Zr, MnO$_2$, Yb$_2$O$_3$, Dy$_2$O$_3$, or ThO$_2$ in the dielectric composition. The specific dielectric constant at 25° C. can however be increased by having an optimum composite ratio of the above components without departing the scope of the present invention.

The insulation resistance exhibits acceptable values although varying more or less depending on the dielectric composition. In fact, the Tc point of Specimen 51 is 7° C., not shown in Table 4. As the result of firing of Specimen 51 carried out at more than 500° C. in the reducing atmosphere associated with 10$^{-15}$ of Po$_2$, the Tc point remains unchanged. Also, the Tc point showed no change during the different firing periods of from 1 to 3 hours at 1250° C. It is thus noted that this is achieved only using the dielectric composition which contains MnO$_2$ and the X component added simultaneously according to the present invention.

Similar experiments were carried out using test laminated ceramic capacitors having different dielectric compositions from that of the present invention. The resultant insulation resistance was found humble when MnO$_2$ was added non or less than 0.5% by molecular weight. Also, when more than 5% by molecular weight, the insulation resistance was virtually reduced. When non of Yb$_2$O$_3$, Dy$_2$O$_3$, and ThO$_2$ was added, the Tc point varied corresponding to the conditions of processing and also, the dielectric constant was disadvantageously low. When the same was added greater than the requirements of the present invention, the sintering quality was radically degraded. When Zr was added more than the rate of the present invention, the Tc point intended to move to the lower side surpassing the common usable range of temperature (about 20° C.) and thus, permitting no high dielectric constant in the laminated ceramic capacitor.

The dielectric composition according to the present invention allows the laminated ceramic capacitor to be favorably high in the dielectric constant, and the insulation resistance and to suppress a variation in the Tc point caused corresponding to the variable conditions of firing.

Experiments were carried out using Ba and Ti+Zr in different molar ratio. The ratio of Ba and Ti+Zr was determined by varying a mixing ratio of BaCO$_3$ and TiO$_2$ in BaTiO$_3$. The characteristics of each test laminated ceramic capacitor containing 10% by molecular weight of BaZrO$_3$, 2% MnO$_2$, and 0 5% Dy$_2$O$_3$ were assessed and the resultant measurements are shown in Table 5.

TABLE 5

| SPECIMEN NO. | Ba/Ti + Zr (MOLAR RATIO) | CHARACTERISTICS DIELECTRIC CONSTANT | tan δ (%) | INSULATION RESISTANCE (Ω) |
|---|---|---|---|---|
| 001 | 0.97 | 13238 | 1.76 | 8.7 × 10$^8$ |
| 002 | 0.98 | 13163 | 1.35 | 6.9 × 10$^{10}$ |
| 003 | 0.99 | 12718 | 1.31 | 8.8 × 10$^{10}$ |
| 004 | 1.00 | 12988 | 1.28 | 9.3 × 10$^{10}$ |
| 005 | 1.01 | 13006 | 1.42 | 1.4 × 10$^{11}$ |
| 006 | 1.02 | 12573 | 1.26 | 7.4 × 10$^{10}$ |
| 007 | 1.03 | 7582 | 1.98 | 1.9 × 10$^{10}$ |

As apparent from Table 5, each specimen according to the present invention exhibits acceptable values of the dielectric constant, dissipation factor, and insulation resistance. However, other comparative specimens show unacceptable results: 001 is low in insulation resistance; and 007 is degraded in sintering quality and low in dielectric constant. Although the resultant measurements in Table 5 were given using the predetermined rates of additives, BaZrO$_3$, MnO$_2$, and Dy$_2$O$_3$, the ratio of Ba/Ti+Zr involved similar results with different dielectric compositions. Accordingly, the ratio of Ba/Ti+Zr has to be from 0.98 to 1.02 as embodied by the present invention.

EXAMPLE 2

This example refers to the composition of the dielectric material in the laminated ceramic capacitor of Example 1 but added with NiO. For making a reagent of NiO, NiO was calcined at 1300° C. in the air for two hours and wet ground with a ball mill for 24 hours. After dried out, the resultant powder of NiO was measured for particle size distribution and the average diameter of particles was found about 1 μm.

The other components than NiO in the dielectric material were also prepared in the same manner as of Example 1 and the ratio of composition is shown in Table 6. Similar to Example 1, the characteristics of each test laminated ceramic capacitor which was made with a different dielectric composition using an NiO paste, as shown in Table 6, were also and the resultant measurements are shown in Table 6.

TABLE 6

| SPECIMEN NO. | BaTiO$_3$ (mol %) | BaZrO$_3$ (mol %) | MnO$_2$ (mol %) | NiO (mol %) | ADDITIVE (mol %) Yb$_2$O$_3$ | ADDITIVE (mol %) Dy$_2$O$_3$ | ADDITIVE (mol %) ThO$_2$ | CHARACTERISTICS DIELECTRIC CONSTANT | CHARACTERISTICS tan δ (%) | CHARACTERISTICS INSULATION RESISTANCE (Ω) |
|---|---|---|---|---|---|---|---|---|---|---|
| 1 | 97.4 | | 0.5 | 0.1 | 2.0 | — | — | 7207 | 1.43 | 4.5 × 10$^{10}$ |
| 2 | " | | " | " | — | 2.0 | — | 7786 | 1.39 | 3.1 × 10$^{10}$ |
| 3 | " | | " | " | — | — | 2.0 | 7404 | 1.40 | 2.4 × 10$^{10}$ |
| 4 | 96.7 | | " | 1.0 | 1.8 | — | — | 8005 | 0.95 | 4.6 × 10$^{10}$ |
| 5 | " | | " | " | — | 1.8 | — | 8211 | 0.87 | 3.5 × 10$^{10}$ |
| 6 | " | | " | " | — | — | 1.8 | 8153 | 0.92 | 3.4 × 10$^{10}$ |
| 7 | 96.0 | | " | 2.0 | 1.5 | — | — | 7814 | 0.75 | 4.2 × 10$^{10}$ |
| 8 | " | | " | " | — | 1.5 | — | 7992 | 0.68 | 3.9 × 10$^{10}$ |
| 9 | " | | " | " | — | — | 1.5 | 7933 | 0.70 | 4.2 × 10$^{10}$ |
| 10 | 96.4 | | 2.0 | 0.1 | 1.5 | — | — | 8429 | 1.28 | 6.0 × 10$^{10}$ |
| 11 | " | | " | " | — | 1.5 | — | 9037 | 1.31 | 4.9 × 10$^{10}$ |
| 12 | " | | " | " | — | — | 1.5 | 8890 | 1.29 | 4.4 × 10$^{10}$ |
| 13 | 95.8 | | " | 1.0 | 1.2 | — | — | 9124 | 0.84 | 5.9 × 10$^{10}$ |
| 14 | " | | " | " | — | 1.2 | — | 9376 | 0.88 | 5.3 × 10$^{10}$ |
| 15 | " | | " | " | — | — | 1.2 | 9181 | 0.76 | 4.8 × 10$^{10}$ |
| 16 | 95.1 | | " | 2.0 | 0.9 | — | — | 8676 | 0.55 | 5.3 × 10$^{10}$ |
| 17 | " | | " | " | — | 0.9 | — | 8882 | 0.60 | 5.1 × 10$^{10}$ |
| 18 | " | | " | " | — | — | 0.9 | 8691 | 0.49 | 4.7 × 10$^{10}$ |
| 19 | 93.9 | | 5.0 | 0.1 | 1.0 | — | — | 8364 | 1.32 | 7.5 × 10$^{10}$ |
| 20 | " | | " | " | — | 1.0 | — | 9528 | 1.35 | 7.0 × 10$^{10}$ |
| 21 | " | | " | " | — | — | 1.0 | 8896 | 1.22 | 4.2 × 10$^{10}$ |
| 22 | 93.25 | | " | 1.0 | 0.75 | — | — | 10025 | 0.95 | 8.2 × 10$^{10}$ |
| 23 | " | | " | " | — | 0.75 | — | 10139 | 0.89 | 7.7 × 10$^{10}$ |
| 24 | " | | " | " | — | — | 0.75 | 10100 | 0.84 | 5.9 × 10$^{10}$ |
| 25 | 92.5 | | " | 2.0 | 0.5 | — | — | 8584 | 0.55 | 6.3 × 10$^{10}$ |
| 26 | 92.5 | | 5.0 | 2.0 | — | 0.5 | — | 9477 | 0.49 | 5.8 × 10$^{10}$ |
| 27 | " | | " | " | — | — | 0.5 | 8845 | 0.53 | 6.5 × 10$^{10}$ |
| 28 | 93.4 | 5.0 | 0.5 | 0.1 | 1.0 | — | — | 11240 | 1.29 | 7.5 × 10$^{10}$ |
| 29 | " | " | " | " | — | 1.0 | — | 11623 | 1.33 | 6.8 × 10$^{10}$ |
| 30 | " | " | " | " | — | — | 1.0 | 11198 | 1.40 | 6.3 × 10$^{10}$ |
| 31 | 92.75 | " | " | 1.0 | 0.75 | — | — | 10685 | 0.93 | 5.9 × 10$^{10}$ |
| 32 | " | " | " | " | — | 0.75 | — | 10929 | 0.99 | 5.7 × 10$^{10}$ |
| 33 | " | " | " | " | — | — | 0.75 | 10543 | 1.02 | 5.8 × 10$^{10}$ |
| 34 | 92.0 | " | " | 2.0 | 0.5 | — | — | 11103 | 0.72 | 6.0 × 10$^{10}$ |
| 35 | " | " | " | " | — | 0.5 | — | 11359 | 0.72 | 4.8 × 10$^{10}$ |
| 36 | " | " | " | " | — | — | 0.5 | 11000 | 0.75 | 5.7 × 10$^{10}$ |
| 37 | " | " | 2.0 | 0.1 | 0.9 | — | — | 11561 | 1.47 | 5.3 × 10$^{10}$ |
| 38 | " | " | " | " | — | 0.9 | — | 11957 | 1.36 | 5.0 × 10$^{10}$ |
| 39 | " | " | " | " | — | — | 0.9 | 11461 | 1.25 | 7.1 × 10$^{10}$ |
| 40 | 91.4 | " | " | 1.0 | 0.6 | — | — | 11321 | 1.02 | 7.1 × 10$^{10}$ |
| 41 | " | " | " | " | — | 0.6 | — | 11564 | 0.96 | 6.4 × 10$^{10}$ |
| 42 | " | " | " | " | — | — | 0.6 | 11438 | 0.84 | 7.5 × 10$^{10}$ |
| 43 | 92.1 | " | " | 2.0 | 0.4 | — | — | 10920 | 0.66 | 6.2 × 10$^{10}$ |
| 44 | " | " | " | " | — | 0.4 | — | 11175 | 0.58 | 4.8 × 10$^{10}$ |
| 45 | " | " | " | " | — | — | 0.4 | 10762 | 0.53 | 5.6 × 10$^{10}$ |
| 46 | 89.4 | " | 5.0 | 0.1 | 0.5 | — | — | 10846 | 1.41 | 7.9 × 10$^{10}$ |
| 47 | " | " | " | " | — | 0.5 | — | 10970 | 1.49 | 6.8 × 10$^{10}$ |
| 48 | " | " | " | " | — | — | 0.5 | 10924 | 1.29 | 6.5 × 10$^{10}$ |
| 49 | 88.7 | " | " | 1.0 | 0.3 | — | — | 11345 | 1.00 | 7.7 × 10$^{10}$ |
| 50 | " | " | " | " | — | 0.3 | — | 11428 | 1.05 | 6.6 × 10$^{10}$ |
| 51 | 88.7 | 5.0 | 5.0 | 1.0 | — | — | 0.3 | 11042 | 0.90 | 6.6 × 10$^{10}$ |
| 52 | 87.8 | " | " | 2.0 | 0.2 | — | — | 10760 | 0.79 | 5.9 × 10$^{10}$ |
| 53 | " | " | " | " | — | 0.2 | — | 11046 | 0.65 | 5.2 × 10$^{10}$ |
| 54 | " | " | " | " | — | — | 0.2 | 10929 | 0.76 | 6.0 × 10$^{10}$ |
| 55 | 88.6 | 10.0 | 0.5 | 0.1 | 0.8 | — | — | 12065 | 1.27 | 1.4 × 10$^{10}$ |
| 56 | " | " | " | " | — | 0.8 | — | 12354 | 1.29 | 1.0 × 10$^{10}$ |
| 57 | " | " | " | " | — | — | 0.8 | 11971 | 1.33 | 8.9 × 10$^{10}$ |
| 58 | " | " | " | " | 0.25 | 0.25 | 0.3 | 11393 | 1.28 | 9.2 × 10$^{10}$ |
| 59 | 87.9 | " | " | 1.0 | 0.6 | — | — | 12259 | 0.87 | 1.0 × 10$^{10}$ |
| 60 | " | " | " | " | — | 0.6 | — | 12468 | 0.86 | 9.5 × 10$^{10}$ |
| 61 | " | " | " | " | — | — | 0.6 | 11925 | 0.93 | 9.2 × 10$^{10}$ |
| 62 | " | " | " | " | 0.2 | 0.2 | 0.2 | 11771 | 0.90 | 9.1 × 10$^{10}$ |
| 63 | 87.1 | " | " | 2.0 | 0.4 | — | — | 11847 | 0.55 | 8.8 × 10$^{10}$ |
| 64 | " | " | " | " | — | 0.4 | — | 12032 | 0.50 | 8.5 × 10$^{10}$ |
| 65 | " | " | " | " | — | — | 0.4 | 11966 | 0.61 | 8.6 × 10$^{10}$ |
| 66 | 87.3 | " | 2.0 | 0.1 | 0.6 | — | — | 10456 | 1.27 | 2.2 × 10$^{10}$ |
| 67 | " | " | " | " | — | 0.6 | — | 12888 | 1.20 | 1.6 × 10$^{10}$ |
| 68 | " | " | " | " | — | — | 0.6 | 11047 | 1.29 | 1.2 × 10$^{10}$ |
| 69 | 88.5 | " | " | 0.5 | 0.5 | — | — | 11326 | 1.12 | 8.6 × 10$^{10}$ |
| 70 | " | " | " | " | — | 0.5 | — | 12150 | 1.05 | 7.1 × 10$^{10}$ |
| 71 | " | " | " | " | — | — | 0.5 | 12074 | 1.09 | 7.2 × 10$^{10}$ |
| 72 | " | " | " | " | 0.25 | 0.25 | — | 11974 | 1.10 | 8.0 × 10$^{10}$ |
| 73 | " | " | " | " | 0.25 | — | 0.25 | 11098 | 1.00 | 7.9 × 10$^{10}$ |
| 74 | " | " | " | " | — | 0.25 | 0.25 | 10914 | 1.04 | 6.8 × 10$^{10}$ |
| 75 | " | " | " | " | 0.15 | 0.15 | 0.20 | 11575 | 1.01 | 7.2 × 10$^{10}$ |
| 76 | 86.6 | 10.0 | 2.0 | 1.0 | 0.4 | — | — | 11344 | 0.85 | 7.4 × 10$^{10}$ |
| 77 | " | " | " | " | — | 0.4 | — | 11605 | 0.79 | 6.9 × 10$^{10}$ |

TABLE 6-continued

| SPECIMEN NO. | BaTiO$_3$ (mol %) | BaZrO$_3$ (mol %) | MnO$_2$ (mol %) | NiO (mol %) | ADDITIVE (mol %) | | | CHARACTERISTICS | | |
|---|---|---|---|---|---|---|---|---|---|---|
| | | | | | Yb$_2$O$_3$ | Dy$_2$O$_3$ | ThO$_2$ | DIELECTRIC CONSTANT | tan δ (%) | INSULATION RESISTANCE (Ω) |
| 78 | " | " | " | " | — | — | 0.4 | 11555 | 0.82 | 6.6 × 10$^{10}$ |
| 79 | 85.75 | " | " | 2.0 | 0.25 | — | — | 10869 | 0.47 | 7.3 × 10$^{10}$ |
| 80 | " | " | " | " | — | 0.25 | — | 11123 | 0.45 | 7.0 × 10$^{10}$ |
| 81 | " | " | " | " | — | — | 0.25 | 11078 | 0.44 | 6.7 × 10$^{10}$ |
| 82 | 84.7 | " | 5.0 | 0.1 | 0.2 | — | — | 10364 | 1.34 | 9.1 × 10$^{10}$ |
| 83 | " | " | " | " | — | 0.2 | — | 12405 | 1.49 | 8.6 × 10$^{10}$ |
| 84 | " | " | " | " | — | — | 0.2 | 11387 | 1.18 | 7.7 × 10$^{10}$ |
| 85 | 84.4 | " | " | 0.5 | 0.1 | — | — | 10433 | 1.05 | 8.6 × 10$^{10}$ |
| 86 | " | " | " | " | — | 0.1 | — | 11122 | 1.11 | 8.1 × 10$^{10}$ |
| 87 | " | " | " | " | — | — | 0.1 | 10623 | 0.97 | 7.8 × 10$^{10}$ |
| 88 | 83.9 | 15.0 | 0.5 | 0.1 | 0.5 | — | — | 10371 | 1.44 | 5.6 × 10$^{10}$ |
| 89 | " | " | " | " | — | 0.5 | — | 11783 | 1.49 | 4.8 × 10$^{10}$ |
| 90 | " | " | " | " | — | — | 0.5 | 10800 | 1.52 | 4.3 × 10$^{10}$ |
| 91 | 83.7 | " | " | 0.5 | 0.3 | — | — | 11474 | 1.04 | 4.8 × 10$^{10}$ |
| 92 | " | " | " | " | — | 0.3 | — | 11634 | 1.13 | 4.0 × 10$^{10}$ |
| 93 | " | " | " | " | — | — | 0.3 | 10888 | 1.20 | 4.2 × 10$^{10}$ |
| 94 | 83.3 | " | " | 1.0 | 0.2 | — | — | 10629 | 0.87 | 3.7 × 10$^{10}$ |
| 95 | " | " | " | " | — | 0.2 | — | 11231 | 0.88 | 3.6 × 10$^{10}$ |
| 96 | " | " | " | " | — | — | 0.2 | 10700 | 0.96 | 3.1 × 10$^{10}$ |
| 97 | 82.7 | " | 2.0 | 0.1 | 0.2 | — | — | 9954 | 1.48 | 6.8 × 10$^{10}$ |
| 98 | " | " | " | " | — | 0.2 | — | 10813 | 1.51 | 6.5 × 10$^{10}$ |
| 99 | " | " | " | " | — | — | 0.2 | 10224 | 1.45 | 6.3 × 10$^{10}$ |
| 100 | 82.4 | " | " | 0.5 | 0.1 | — | — | 11006 | 1.20 | 6.4 × 10$^{10}$ |
| 101 | 82.4 | 15.0 | 2.0 | 0.5 | — | 0.1 | — | 11944 | 1.09 | 5.7 × 10$^{10}$ |
| 102 | " | " | " | " | — | — | 0.1 | 11536 | 1.12 | 6.1 × 10$^{10}$ |
| 103 | 81.8 | 15.0 | 3.0 | 0.1 | 0.1 | — | — | 8845 | 1.50 | 7.1 × 10$^{10}$ |
| 104 | " | " | " | " | — | 0.1 | — | 9338 | 1.53 | 6.2 × 10$^{10}$ |
| 105 | " | " | " | " | — | — | 0.1 | 8678 | 1.57 | 4.9 × 10$^{10}$ |
| 106 | 79.2 | 20.0 | 0.5 | 0.1 | 0.2 | — | — | 8914 | 1.45 | 8.7 × 10$^{10}$ |
| 107 | " | " | " | " | — | 0.2 | — | 9583 | 1.35 | 8.2 × 10$^{10}$ |
| 108 | " | " | " | " | — | — | 0.2 | 9269 | 1.42 | 5.3 × 10$^{10}$ |
| 109 | 78.4 | " | " | 1.0 | 0.1 | — | — | 9733 | 1.00 | 7.3 × 10$^{10}$ |
| 110 | " | " | " | " | — | 0.1 | — | 10624 | 0.93 | 6.2 × 10$^{10}$ |
| 111 | " | " | " | " | — | — | 0.1 | 10382 | 0.99 | 5.9 × 10$^{10}$ |
| 112 | 78.8 | " | 1.0 | 0.1 | 0.1 | — | — | 8436 | 1.43 | 6.9 × 10$^{10}$ |
| 113 | " | " | " | " | — | 0.1 | — | 9620 | 1.38 | 7.2 × 10$^{10}$ |
| 114 | " | " | " | " | — | — | 0.1 | 9083 | 1.43 | 8.1 × 10$^{10}$ |

As shown in Table 6, each test laminated ceramic capacitor having the dielectric material added with NiO is high in the dielectric constant and practically acceptable in both the dissipation factor and the insulation resistance. Particularly, the dissipation factor (tan δ) decreases as the addition of NiO is increased. It is thus understood that NiO is an effective additive for lowering the value of tan δ. The limited range of NiO addition according to the present invention will now be described. A small amount of NiO works effectively as compared with the result of Example 1. However, if over 2% by molecular weight of NiO is added, it will also be reduced during the reducing procedure and remain as a metal Ni in the firing procedure without diffusion in the form of oxide throughout the dielectric material, thus lowering the insulation resistance. The addition of NiO is then effective only within the scope of the present invention.

Although the molar ratio of Ba and Ti+Zr was 1.00 in the dielectric material of Table 6, different values of the ratio were examined. The ratio of Ba and Ti+Zr was appropriately adjusted in the same manner as of Example 1. Similarly, the characteristics of each test laminated ceramic capacitor containing 10% molecular weight of BaZrO$_3$, 2% MnO$_2$, 0.5% NiO, and 0.5% Dy$_2$O$_3$ were measured and the resultant measurements are shown in Table 7.

TABLE 7

| SPECIMEN NO. | Ba/Ti + Zr MOLAR RATIO | CHARACTERISTICS | | |
|---|---|---|---|---|
| | | DIELECTRIC CONSTANT | tan δ (%) | INSULATION RESISTANCE (Ω) |
| A | 0.97 | 12567 | 1.29 | 7.7 × 10$^7$ |
| B | 0.98 | 12308 | 1.22 | 4.6 × 10$^{10}$ |
| C | 0.99 | 12244 | 1.14 | 5.8 × 10$^{10}$ |
| D | 1.00 | 12150 | 1.05 | 7.1 × 10$^{10}$ |
| F | 1.01 | 12179 | 1.08 | 9.8 × 10$^{10}$ |
| G | 1.02 | 11894 | 1.06 | 8.9 × 10$^{10}$ |
| H | 1.03 | 6531 | 1.40 | 2.0 × 10$^{10}$ |

As apparent from Table 7, the addition of NiO becomes effective only with the ratio of Ba and Ti+Zr according to the present invention. As shown, Specimen A is low in the insulation resistance and Specimen G is degraded in the sintering quality and low in the dielectric constant. Although NiO is effective for reducing the value of tan δ as described with Tables 6 and 7, it will lower the firing temperature thus increasing the structural density of the dielectric material. This effect was given by firing at 1250° C. during the experiments of the present invention and also, at 1225° C. Two types of specimens produced through firing at 1225° C. and 1250° C. respectively were tested using a thermal humidity bias test (85° C-85% RH-50VDC). As the result after a test duration of one thousand hours, almost no reduction in the insulation resistance was found with both the specimens and the capacitance was measured ±10% in ΔC/C showing high reliability.

EXAMPLE 3

This example refers to the addition of $Y_2O_3$ to the dielectric material.

$BaTiO_3$ and $BaZrO_3$ were composed by solid state reaction the same manner as of Example 1 and wet ground with a ball mill for 72 hours. The average diameter of resultant particles of $BaTiO_3$ and $BaZrO_3$ was about 0.8 μm measured with SEM. $MnO_2$, $Dy_2O_3$, $Yb_2O_3$, and $ThO_2$ were similarly prepared while $Y_2O_3$ was a regent of 99.9% pure. $BaTiO_3$, $BaZrO_3$, $MnO_2$, $Y_2O_3$, and at least one of $Dy_2O_3$, $Yb_2O_3$ and $ThO_2$ were designated as the dielectric material which was then added with organic additives and mixed by a ball mill turning to a slurry form. The conditions of making a slurry is shown in Table 8.

TABLE 8

| MATERIAL | | LOADED AMOUNT |
|---|---|---|
| DIELECTRIC MATERIAL | | 100 g |
| ORGANIC BINDER | PVB RESIN (BMS) | 10 g |
| PLASTICIZER | DIBUTYL PHTHALATE (DBP) | 5 g |
| SOLVENT | 1.1.1 TRICHLORO-ETHANE | 100 g |
|  | n-BUTYL ACETATE | 70 g |

From the slurry, a green sheet was produced having a thickness of about 40 μm after drying with the use of a blade. Particles of NiO, 0.8 μm in average diameter employed for making an NiO paste for the inner electrodes was milled by a three-roll mill under the conditions shown in Table 9.

TABLE 9

| MATERIAL | | | LOADED AMOUNT |
|---|---|---|---|
| INORGANIC COMPONENT | NiO 0.8 μm | | 10 g |
| ORGANIC COMPONENT | BINDER | ETHYL CELLULOSE (100 CPS) | 7.5 cc 10 wt % |
|  | SOLVENT | TERPINEOL | 90 wt % |

Then, a lamination was developed by sandwiching the green sheets with the NiO paste, similar to Example 1. The lamination consisting of ten layers was coated at both the top and bottom ends with ineffective layers of 300 μm thickness respectively, thus having a total thickness of about 1 mm. The lamination was then heat treated under the conditions of temperature and atmosphere shown in FIGS. 2, 3, and 4 and the resultant laminated ceramic capacitor was in turn examined in the characteristics.

The measurements of characteristics and the ratio of composition are shown in Tables 10, 11, and 12.

TABLE 10

| SPECIMEN NO. | $BaTiO_3$ (mol %) | $BaZrO_3$ (mol %) | $MnO_2$ (mol %) | $Yb_2O_3$ (mol %) | $Y_2O_3$ (mol %) | DIELECTRIC CONSTANT | tan δ (%) | INSULATION RESISTANCE (Ω) |
|---|---|---|---|---|---|---|---|---|
| 1 | 87 | 12.5 | 1.0 | 0.25 | 0.25 | 11900 | 2.9 | $8.0 \times 10^{10}$ |
| 2 | 88.25 | 10.0 | 1.0 | 0.25 | 0.50 | 11500 | 3.0 | $9.2 \times 10^{10}$ |
| 3 | 88.25 | 10.0 | 1.0 | 0.5 | 0.25 | 12100 | 3.1 | $7.4 \times 10^{10}$ |
| 4 | 90.5 | 7.5 | 1.0 | 0.5 | 0.5 | 11800 | 2.8 | $7.8 \times 10^{10}$ |
| 5 | 86.6 | 11.0 | 2.0 | 0.20 | 0.20 | 11800 | 2.8 | $8.3 \times 10^{10}$ |
| 6 | 87.5 | 10.0 | 2.0 | 0.20 | 0.30 | 11600 | 2.7 | $9.1 \times 10^{10}$ |
| 7 | 87.5 | 10.0 | 2.0 | 0.25 | 0.25 | 12000 | 3.0 | $8.2 \times 10^{10}$ |
| 8 | 92.0 | 5.0 | 2.0 | 0.50 | 0.50 | 11700 | 3.1 | $7.7 \times 10^{10}$ |
| 9 | 94.0 | 2.5 | 2.0 | 0.75 | 0.75 | 11400 | 2.9 | $7.0 \times 10^{10}$ |
| 10 | 82.3 | 12.5 | 5.0 | 0.10 | 0.10 | 11300 | 2.8 | $8.1 \times 10^{10}$ |
| 11 | 84.6 | 10.0 | 5.0 | 0.20 | 0.20 | 11800 | 2.9 | $7.9 \times 10^{10}$ |
| 12 | 86.0 | 8.5 | 5.0 | 0.25 | 0.25 | 11800 | 3.0 | $8.4 \times 10^{10}$ |
| 13 | 91.5 | 2.5 | 5.0 | 0.5 | 0.5 | 11500 | 2.7 | $8.2 \times 10^{10}$ |
| 14 | 87.5 | 10.0 | 2.0 | 0.5 | — | 12400 | 2.8 | $1.2 \times 10^{10}$ |
| 15 | 87.5 | 10.0 | 2.0 | — | 0.5 | 10000 | 2.6 | $8.8 \times 10^{10}$ |

As shown, Specimens 14 and 15 exhibit the addition of one additive, $Yb_2O_3$ and $Y_2O_3$ respectively for comparison of the initial characteristics.

TABLE 11

| SPECIMEN NO. | $BaTiO_3$ (mol %) | $BaZrO_3$ (mol %) | $MnO_2$ (mol %) | $Dy_2O_3$ (mol %) | $Y_2O_3$ (mol %) | DIELECTRIC CONSTANT | tan δ (%) | INSULATION RESISTANCE (Ω) |
|---|---|---|---|---|---|---|---|---|
| 16 | 87 | 12.5 | 1.0 | 0.25 | 0.25 | 12300 | 2.4 | $4.5 \times 10^{10}$ |
| 17 | 88.25 | 10.0 | 1.0 | 0.25 | 0.50 | 12000 | 2.1 | $6.2 \times 10^{10}$ |
| 18 | 90.5 | 7.5 | 1.0 | 0.5 | 0.50 | 12300 | 2.1 | $5.0 \times 10^{10}$ |
| 19 | 87.5 | 10.0 | 2.0 | 0.15 | 0.35 | 12200 | 2.1 | $7.2 \times 10^{10}$ |
| 20 | 87.5 | 10.0 | 2.0 | 0.25 | 0.25 | 12500 | 2.0 | $5.1 \times 10^{10}$ |
| 21 | 92.0 | 5.0 | 2.0 | 0.5 | 0.5 | 12200 | 2.3 | $4.8 \times 10^{10}$ |
| 22 | 87.0 | 7.5 | 5.0 | 0.25 | 0.25 | 12500 | 2.3 | $5.4 \times 10^{10}$ |
| 23 | 87.5 | 10.0 | 2.0 | 0.5 | — | 13700 | 2.6 | $1.0 \times 10^{10}$ |
| 24 | 87.5 | 10.0 | 2.0 | — | 0.5 | 10200 | 2.0 | $8.5 \times 10^{10}$ |

As shown, Specimens 23 and 24 exhibit the addition of one additive, and $Dy_2O_3$ and $Y_2O_3$ respectively for comparison of the initial characteristics.

TABLE 12

| SPECIMEN NO. | BaTiO$_3$ (mol %) | BaZrO$_3$ (mol %) | MnO$_2$ (mol %) | ThO$_2$ (mol %) | Y$_2$O$_3$ (mol %) | INITIAL CHARACTERISTICS ||| 
|---|---|---|---|---|---|---|---|---|
| | | | | | | DIELECTRIC CONSTANT | tan δ (%) | INSULATION RESISTANCE (Ω) |
| 25 | 87.0 | 12.5 | 1.0 | 0.25 | 0.25 | 12100 | 2.4 | 6.2 × 10$^{10}$ |
| 26 | 88.25 | 10.0 | 1.0 | 0.25 | 0.50 | 11900 | 2.4 | 7.3 × 10$^{10}$ |
| 27 | 90.5 | 7.5 | 1.0 | 0.50 | 0.50 | 12000 | 2.5 | 5.8 × 10$^{10}$ |
| 28 | 87.5 | 10.0 | 2.0 | 0.15 | 0.35 | 12200 | 2.5 | 6.5 × 10$^{10}$ |
| 29 | 87.5 | 10.0 | 2.0 | 0.25 | 0.25 | 11800 | 2.6 | 7.7 × 10$^{10}$ |
| 30 | 92.0 | 5.0 | 2.0 | 0.5 | 0.5 | 12000 | 2.4 | 7.1 × 10$^{10}$ |
| 31 | 87.0 | 7.5 | 5.0 | 0.25 | 0.25 | 11600 | 2.7 | 8.2 × 10$^{10}$ |
| 32 | 87.5 | 10.0 | 2.0 | 0.5 | — | 12400 | 2.7 | 1.2 × 10$^{10}$ |
| 33 | 87.5 | 10.0 | 2.0 | — | 0.5 | 10000 | 2.6 | 7.9 × 10$^{10}$ |

As shown, Specimens 32 and 33 exhibit the addition of one additive, ThO$_2$ and Y$_2$O$_3$ respectively for comparison of the initial characteristics.

Specimens 15, 24, and 33 have the same composition but are different in the respect of firing lots.

As shown in Tables 10, 11, and 12, Y$_2$O$_3$ and one of Yb$_2$O$_3$, Dy$_2$O$_3$ and ThO$_2$ are added simultaneously and thus, each can exhibit its own characteristics, allowing the dielectric constant to be increased and the insulation resistance to be improved Y$_2$O$_3$ is also effective for having the crystalline particles of the dielectric material to be uniform in diameter and simultaneously, suppressing the grain growth. Specimens 14, 23, and 32 in Tables 10, 11, and 12 respectively were 5 to 6 μm in the average crystalline particle diameter while containing non of Y$_2$O$_3$, however, in which considerable numbers of particles over 10 μm in diameter were detected and the distribution of crystalline particles was not uniform. On the other hand, it was verified with SEM photography that the addition of Y$_2$O$_3$ provides the crystalline particles having an average diameter of 3 to 4 μm and exhibiting a uniform distribution.

The specimens having Y$_2$O$_3$ added were also tested for resistance to moisture under the conditions of 85° C., 85% RH, and 50VDC bias during a period of a thousand hours, resulting in an increase or over 10$^{10}$Ω in the insulation resistance and improvement in the operational reliability.

The characteristics are shown in Tables 13 and 14 correpsonding to the simultaneous addition of both Y$_2$O$_3$ and NiO.

TABLE 13

| SPECIMEN NO. | BaTiO$_3$ (mol %) | BaZrO$_3$ (mol %) | MnO$_2$ (mol %) | Yb$_2$O$_3$ (mol %) | Y$_2$O$_3$ (mol %) | NiO (mol %) | INITIAL CHARACTERISTICS ||| 
|---|---|---|---|---|---|---|---|---|---|
| | | | | | | | DIELECTRIC CONSTANT | tan δ (%) | INSULATION RESISTANCE (Ω) |
| 34 | 85.9 | 12.5 | 1.0 | 0.25 | 0.25 | NiO 0.1 | 11800 | 2.4 | 8.2 × 10$^{10}$ |
| 35 | 85.5 | 12.5 | 1.0 | 0.25 | 0.25 | NiO 0.5 | 12000 | 2.1 | 7.9 × 10$^{10}$ |
| 36 | 86.4 | 11.0 | 2.0 | 0.20 | 0.20 | NiO 0.2 | 11900 | 2.5 | 7.6 × 10$^{10}$ |
| 37 | 86.1 | 11.0 | 2.0 | 0.20 | 0.20 | NiO 0.5 | 11900 | 2.1 | 7.9 × 10$^{10}$ |
| 38 | 87.0 | 10.0 | 2.0 | 0.25 | 0.25 | NiO 0.5 | 11700 | 2.0 | 8.0 × 10$^{10}$ |
| 39 | 86.5 | 10.0 | 2.0 | 0.25 | 0.25 | NiO 1.0 | 11800 | 1.9 | 7.5 × 10$^{10}$ |
| 40 | 86.0 | 10.0 | 2.0 | 0.25 | 0.25 | NiO 1.5 | 11900 | 1.8 | 7.3 × 10$^{10}$ |
| 41 | 85.5 | 10.0 | 2.0 | 0.25 | 0.25 | NiO 2.0 | 11600 | 1.7 | 7.3 × 10$^{10}$ |

TABLE 14

| SPECIMEN NO. | BaTiO$_3$ (mol %) | BaZrO$_3$ (mol %) | MnO$_2$ (mol %) | Dy$_2$O$_3$ (mol %) | Y$_2$O$_3$ (mol %) | NiO (mol %) | INITIAL CHARACTERISTICS ||| 
|---|---|---|---|---|---|---|---|---|---|
| | | | | | | | DIELECTRIC CONSTANT | tan δ (%) | INSULATION RESISTANCE (Ω) |
| 24 | 87.4 | 10.0 | 2.0 | 0.25 | 0.25 | NiO 0.1 | 12600 | 1.8 | 5.6 × 10$^{10}$ |
| 25 | 87.0 | 10.0 | 2.0 | 0.25 | 0.25 | NiO 0.5 | 12200 | 1.5 | 5.3 × 10$^{10}$ |
| 26 | 84.67 | 12.5 | 2.0 | 0.09 | 0.24 | NiO 0.5 | 12200 | 1.7 | 7.3 × 10$^{10}$ |
| 27 | 84.17 | 12.5 | 2.0 | 0.09 | 0.24 | NiO 1.0 | 11900 | 1.4 | 7.0 × 10$^{10}$ |
| 28 | 86.0 | 10.0 | 2.0 | 0.25 | 0.25 | NiO 1.5 | 11800 | 1.3 | 7.8 × 10$^{10}$ |
| 29 | 85.5 | 10.0 | 2.0 | 0.25 | 0.25 | NiO 2.0 | 11700 | 1.2 | 6.7 × 10$^{10}$ |

As apparent from the Tables 13 and 14, Y$_2$O$_3$ and NiO are equally effective when added simultaneously. More specifically, Y$_2$O$_3$ increases the insulation resistance while NiO decreases the dissipation factor. Also, it was verified that the firing temperature of 1225° C. offers the same characteristics as at 1250° C.

EXAMPLE 4

This example refers to the addition of Ca.

$BaTiO_3$ produced by an oxalate procedure was about 0.6 μm in the average particle diameter. Ca was added in the form of commercially available $CaZrO_3$ (Paracerum CZ, a trade name of Nihon Chemical Industries. The other components were the same as of Example 1).

The conditions for making a slurry and a green sheet are shown in Tables 15 and 16.

TABLE 15

| MATERIAL | LOADED AMOUNT |
|---|---|
| DIELECTRIC MATERIAL | 80 g |
| ORGANIC BINDER — PVB RESIN (BMS) | 12 g |
| PLASTICIZER — DIBUTYL PHTHALATE (DBP) | 6 g |
| SOLVENT — 1.1.1 TRICHLORO-ETHANE | 105 g |
| n-BUTYL ACETATE | 70 g |

TABLE 16

| CONDITION | | THICKNESS OF GREEN SHEET |
|---|---|---|
| GAP | 175 μm | ABOUT 20 μm AFTER DRYING |
| FILMING SPEED | 180 mm/min | |

Similarly, the lamination was developed using dielectric green sheets and an NiO paste, of which sizes and associated conditions are listed in Table 17.

TABLE 17

| | ITEM | CONDITION |
|---|---|---|
| CHIP CONDITIONS | CHIP SIZE | 1.9 ~ 3.8 mm |
| | ELECTRODE SIZE | 1.0 ~ 2.4 mm |
| | THICKNESS OF EFFECTIVE LAYER | ABOUT 20 μm |
| | NUMBER OF PRINTED LAYER | 6 LAYERS |
| | NUMBER OF EFFECTIVE LAYER | 5 LAYERS |
| | THICKNESS OF NON-EFFECTIVE LAYER | ABOUT 300 μm |

TABLE 17-continued

| | ITEM | CONDITION |
|---|---|---|
| | THICKNESS OF CHIP | ABOUT 700 μm |
| LAMINATING | THERMAL PRESS CONDITIONS | 40° C. 150 kg/cm² |

Figure 2:
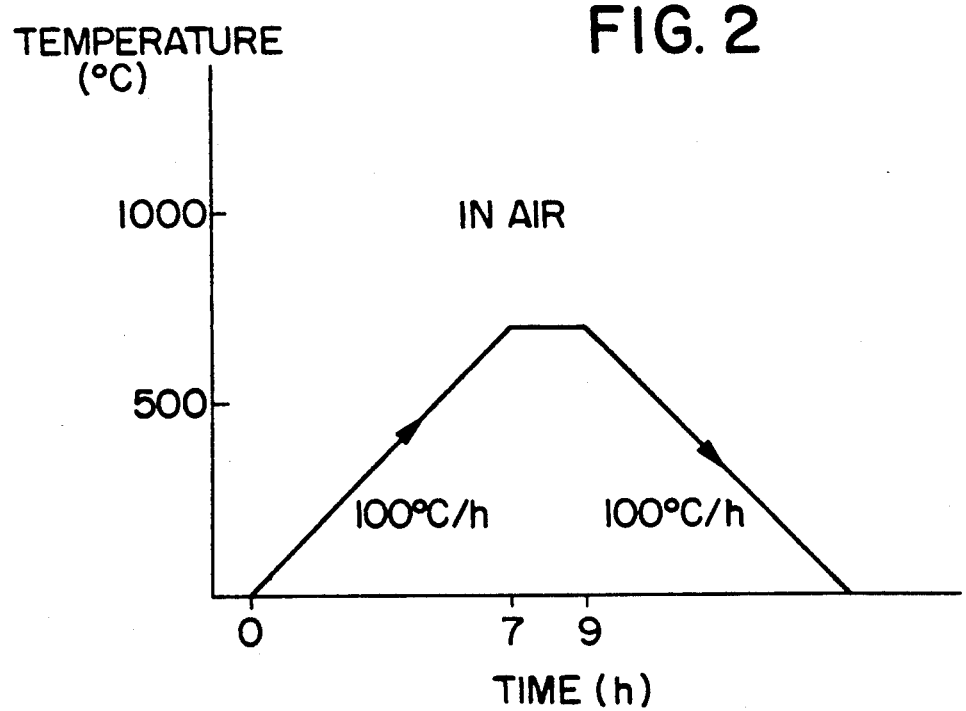
FIG. 2 is a diagram showing a relation of the atmospheric profile to the temperature at the step of removal of binder during a procedure of making the laminated ceramic capacitor of the present invention.

From the laminations, some test laminated ceramic capacitors were produced by the procedures of FIGS. 2, 3, and 4 and their characteristics were examined.

The resultant measurements of characteristics are shown in Table 18 together with compositions of the dielectric material, in which the dielectric layer in each specimen is about 14 μm in thickness and about 1.75 mm × 0.75 mm in the effective electrode area per layer.

TABLE 18

| SPECIMEN NO. | $BaTiO_3$ (mol %) | $CaZrO_3$ (mol %) | $BaZrO_3$ (mol %) | $MnO_2$ (mol %) | $Yb_2O_3$ (mol %) | $Dy_2O_3$ (mol %) | DIELECTRIC CONSTANT | tan δ (%) | INSULATION RESISTANCE (Ω) | DIAMETER OF CRYSTALLINE PARTICLE |
|---|---|---|---|---|---|---|---|---|---|---|
| 1 | 88.5 | 0.1 | 9.9 | 1.0 | 0.5 | — | 11600 | 1.1 | $1.8 \times 10^{11}$ | 3~4 μm |
| 2 | " | " | " | " | — | 0.5 | 12000 | 1.0 | $2.0 \times 10^{11}$ | " |
| 3 | " | " | " | " | 0.25 | 0.25 | 11900 | 1.0 | $2.0 \times 10^{11}$ | " |
| 4 | " | 0.5 | 9.5 | " | 0.5 | — | 11800 | 0.9 | $2.2 \times 10^{11}$ | " |
| 5 | " | " | " | " | — | 0.5 | 12300 | 1.0 | $2.4 \times 10^{11}$ | " |
| 6 | " | " | " | " | 0.25 | 0.25 | 12200 | 1.0 | $2.4 \times 10^{11}$ | " |
| 7 | " | 1.0 | 9.0 | " | 0.5 | — | 12400 | 1.0 | $2.6 \times 10^{11}$ | " |
| 8 | " | " | " | " | — | 0.5 | 12900 | 0.9 | $2.5 \times 10^{11}$ | " |
| 9 | " | " | " | " | 0.25 | 0.25 | 12500 | 0.9 | $2.5 \times 10^{11}$ | " |
| 10 | " | 0.5 | 8.5 | 2.0 | 0.5 | — | 12300 | 1.1 | $2.4 \times 10^{11}$ | " |
| 11 | " | " | " | " | — | 0.5 | 12700 | 1.1 | $2.4 \times 10^{11}$ | " |
| 12 | " | 1.0 | 8.0 | " | 0.5 | — | 12600 | 1.1 | $2.6 \times 10^{11}$ | " |
| 13 | " | " | " | " | — | 0.5 | 12700 | 1.2 | $2.5 \times 10^{11}$ | " |
| 14 | 86.5 | 0.5 | 7.5 | 5.0 | 0.5 | — | 12200 | 0.9 | $2.2 \times 10^{11}$ | " |
| 15 | " | 1.0 | 7.0 | " | — | 0.5 | 12500 | 0.9 | $2.2 \times 10^{11}$ | " |
| 16 | 88.5 | 0 | 9.0 | 2.0 | 0.5 | — | 12200 | 1.4 | $1.6 \times 10^{11}$ | >5 μm |
| 17 | " | 0 | " | " | — | 0.5 | 12600 | 1.5 | $1.5 \times 10^{11}$ | >5 μm |

As shown, Specimens 16 and 17 are provided for comparison, having non of $CaZrO_3$.

The diameter of the crystalline particles shown in Table 18 was measured with SEM photography while the lamination had been mirror polished on the cross section and etched using a mixture solution of HF, $HNO_3$, and $H_2O$.

As apparent from the resultant measurements of Table 18, the dielectric material containing Ca is not declined in the dielectric constant nor insulation resistance as compared with that having $Yb_2O_3$ and $Dy_2O_3$ added. The addition of Ca intends to increase the insulation resistance but by a small degree. Also, the addition of Ca permits the crystalline particles to be constantly 3 to 4 μm in diameter smaller than that having Ca, offering the same effect as of $Y_2O_3$. This is much noticeable because each dielectric layer becomes as thin as less than 10 μm in the near future corresponding to the requirement for further minimizing a film thickness for mass capacitance. Accordingly, it will then be required to have the dielectric constant to be increased while severely restricting the size of crystalline particles. In this regard, the dielectric material according to the present invention can most preferably be utilized. It should however be noted that the sintering quality will sharply be deteriorated when the addition of Ca surpasses the requirement of the present invention. Also, the Tc point may vary due to a change in the firing atmosphere; if any, by 10° C. at maximum, thus ensuring no stability nor reproductivity in the production of capacitors. This disadvantage cannot be suppressed by using $Yb_2O_3$ and $Dy_2O_3$ which both are substantially capable of preventing displacement of Tc.

Accordingly, the addition of Ca is necessarily effected within the scope of the present invention and also, concerned with the participation of $MnO_2$, $Yb_2O_3$, and $Dy_2O_3$.

Although the compositions of the dielectric material according to the present invention are described partly but not all, it will be apparent that the addition of Ca is preferred for providing novel characteristics without affecting the other ingredients.

All the specimens used were tested for a duration of one thousand hours by thermal bias (85° C.-100VDC) life test and thermal humidity bias (85° C.-85% RH-50VDC) test in order to check for operational reliability. The resultant capacitance variations ($\Delta C/C$) of both the 1000-hour tests are within $\pm 10\%$ and the resultant insulation resistance is over $10^{10} \Omega$ in every specimen Hence, it is understood that the laminated ceramic capacitor of the present invention is arranged ensuring high operational reliability.

Using specimens of the present invention, a change in the characteristics was examined during the plating procedure, in which plating of Ni and soldering metal to the outer electrodes was carried out in solutions of pH4 and pH 1 respectively. As the result, no change was found. It may be acknowledged that the result of no change was because Ca permits the crystalline particles to be sintered uniformly and closely. Although $CaZrO_3$ was employed for addition of Ca, as describe above, the same effects were given using CaO, but on condition that the molar ratio of $Ba+Ca/Ti+Zr$ is within the scope of the present invention.

The embodiments of the present invention are described referring to Examples 1 to 4, in which the starting materials of $BaTiO_3$ and $BaZrO_3$ are not limited to products by a solid phase method or oxalate procedure. An alkoxide procedure or a method of hydrothermal synthesis will be employed with equal success. Also, the organic composition for shifting to a slurry is not limited to that of the embodiments. It is understood that the firing procedure for making laminated ceramic capacitors is not limited to the conditions shown in FIGS. 2, 3, and 4. More particularly, the procedure of eliminating binders is for removing the organic ingredients from the primary body and thus, can arbitrarily be controlled with an optimum temperature to the organic binder or plasticizer to be removed. As the reduction procedure is for shifting NiO of the starting material of electrodes to Ni by reduction, the usable temperature varies depending on the average size of NiO particles. It should be noted that if the removal of binders was executed at an excessively high temperature, the dielectric material will be sintered causing difficulties in penetration of $H_2$ gas. Specifically, the dielectric ceramic composition of the present invention remained not semiconductized during the reduction at 400° C. nor declined in the insulation resistance.

It is thus understood that the laminated ceramic capacitor according to the present invention is arranged minimized in size, increased in capacitance, and reduced in cost of production and thus, will be applicable to the field of large capacitance capacitors including an aluminum electrolysis capacitor and a tantalum electrolysis capacitor.

Also, the laminated ceramic capacitor of the present invention will contribute to the small size, the light weight, and the high density of any electronic apparatus, ensuring the advantage in corresponding to various industrial applications.

What is claimed is:

1. A laminated ceramic capacitor comprising a plurality of inner electrode layers for developing a capacitance, dielectric layers sandwiched with the inner electrode layers, and a pair of outer electrodes coupled to their associated inner electrode layers for output of the capacitance, the inner electrode layers being made of Ni, and the dielectric layers being made of a dielectric ceramic composition having a structural formula of:

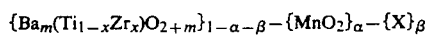

where X is at least one of $Yb_2O_3$, $Dy_2O_3$, and $ThO_2$ and m, x, $\alpha$, and $\beta$ are expressed as:

$$0.98 \leq m \leq 1.02$$

$$0 \leq x \leq 0.2$$

$$0.005 \leq \alpha \leq 0.05$$

$$0.001 \leq \beta \leq 0.02.$$

2. A laminated ceramic capacitor according to claim 1, wherein from 0.1% to 2% by molecular weight of NiO is added to the dielectric ceramic composition of the dielectric layers.

3. A laminated ceramic capacitor according to claim 1, wherein from 0.1% to 1% by molecular weight of $Y_2O_3$ is added to the dielectric ceramic composition of the dielectric layers.

4. A laminated ceramic capacitor according to claim 3, wherein from 0.1% to 2% by molecular weight of NiO is further added to the dielectric ceramic composition of the dielectric layers.

5. A laminated ceramic capacitor comprising a plurality of inner electrode layers for developing a capacitance, dielectric layers sandwiched with the inner electrode layers, and a pair of outer electrodes coupled to their associated inner electrode layers for output of the capacitance, the inner electrode layers being made of Ni, and the dielectric layers being made of a dielectric ceramic composition having a structural formula of:

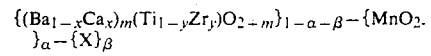

where X is at least one of $Yb_2O_3$ and $Dy_2O_3$ and m, x, y, $\alpha$, and $\beta$ are expressed as:

$$0.98 \leq m \leq 1.02$$

$$0 < x \leq 0.02$$

$$0 \leq y \leq 0.2$$

$$0.005 \leq \alpha \leq 0.05$$

$$0.001 \leq \beta \leq 0.02.$$

* * * * *